United States Patent [19]
de Graaf et al.

[11] Patent Number: 5,520,896
[45] Date of Patent: May 28, 1996

[54] PROCESS TO REMOVE METAL SPECIES FROM EXHAUST VAPORS

[75] Inventors: Aart P. de Graaf, Goes; Georg H. Lindner, Vlissingen; Leendert C. Hoekman, Goes, all of Netherlands

[73] Assignee: Elf Atochem North America, Inc., Philadelphia, Pa.

[21] Appl. No.: 272,500

[22] Filed: Jul. 9, 1994

Related U.S. Application Data

[63] Continuation of Ser. No. 898,107, Jun. 12, 1992, abandoned, which is a continuation-in-part of Ser. No. 578,570, Sep. 9, 1990, abandoned, which is a continuation-in-part of Ser. No. 406,482, Sep. 13, 1989, abandoned.

[51] Int. Cl.[6] ............................ B01D 53/64; B01D 53/68
[52] U.S. Cl. .................. 423/240 R; 423/210; 423/245.2; 95/233; 95/234
[58] Field of Search ............................ 427/255, 345; 423/245.1, 245.2, 210, 240 R; 55/223, 244; 95/233, 234, 288

[56] References Cited

U.S. PATENT DOCUMENTS

| | | | |
|---|---|---|---|
| 3,460,900 | 8/1969 | Moldovan et al. | 423/240 R |
| 3,564,817 | 2/1971 | Kleinfelder et al. | 55/71 |
| 3,789,109 | 1/1974 | Lyon et al. | 423/481 |
| 4,029,484 | 6/1977 | Fitzpatrick | 55/71 |
| 4,144,362 | 3/1979 | Larkin | 427/226 |
| 4,511,545 | 4/1985 | Stone et al. | 423/240 |
| 4,612,176 | 9/1986 | Stone | 423/240 |

*Primary Examiner*—Gary P. Straub
*Assistant Examiner*—Timothy C. Vanoy
*Attorney, Agent, or Firm*—Stanley A. Marcus; Nicholas J. DeBenedictis

[57] ABSTRACT

The effluent stream from the treatment of glass with vapor-phase coating materials contains tin residues. By washing that effluent stream, in an apparatus having a scrubber bed and flow-control and -recycling means, with an acidic solution having a limited concentration of the tin residue, recovery efficiency of the post-coating treatment is improved, and process emissions are reduced.

16 Claims, 1 Drawing Sheet

PROCESS TO REMOVE METAL SPECIES FROM EXHAUST VAPORS

CROSS-REFERENCE TO RELATED APPLICATIONS

This is a continuation of application (s) Ser. No. 898,107 filed on Jun. 12, 1992 now abandoned which in turn is a continuation-in-part of application Ser. No. 07/578,570 filed Sep. 9, 1990, which is a continuation-in-part of then pending application Ser. No. 07/406,482 filed Sep. 13, 1989 both applications now abandoned.

BACKGROUND OF THE INVENTION

1. Field of the Invention

This invention is the field of removing metal or organo-metal species from exhaust vapors. More particularly, the present invention is in the field of removal of tin- or organotin-halide species from exhaust vapors discharged during manufacturing, generally glass-coating, processes.

2. Description of the Prior Art

A number of industrial processes release metal vapors into the atmosphere; in order to protect the environment, limits have been established and continue to be revised as to the amount of metal which may be so released. This fact may require modification or even abandonment of inefficient or poorly controllable processes; alternatively, additional process steps to remove metal species from the exhaust gases may be necessary to allow continuation of the processes. Such well-known processes employ methods such as scrubbing the exhaust gases with water, employing filters with absorbing solids, e.g., carbon, incinerating the exhaust gases, and passing the gases through dust filters or electrostatic precipitators.

Glass surfaces, especially bottle surfaces, are coated with metal oxides, and specifically tin oxides by a number of well-known industrial processes, including chemical-vapor deposition (CVD). The tin-oxide coating serves as a base for other coatings, i.e. waxes, to assist in further processing of the bottles by providing scratch resistance and reduced coefficient of friction. This coating process allows weigh reduction in glass packaging over that otherwise obtainable, and makes it possible to run bottle-filling lines at very high speeds.

In the tin-oxide CVD coating process, alkyltin chlorides are evaporated in a coating hood and caused to contact the glass surface of the freshly formed bottle, where the temperature is in the vicinity of 600 degrees Celsius (° C.). From 10 to about 50 percent of the tin chemical reacts on the bottle surface to form a thin coating of tin oxide. The remaining metal chemical, hydrochloric acid and other decomposition products are exhausted from the coating hood as gaseous products.

Emission standards in some countries do not permit the release of deleterious gases into the atmosphere, and require treatment to assure that emissions are not harmful. However, the act of cleaning may itself lead to another waste stream, unless the waste material is recovered in a usable form. Some methods are available to clean the exhaust gases from glass-coating processes which use tin chemicals.

In principle, gases can be treated with high-energy devices, i.e., venturi scrubbers, in which process the recirculating water is kept at a neutral pH through the addition of sodium hydroxide. The tin chemicals precipitate, and are removed by settling, filtering, centrifugation, or other separation process which may be difficult to administer. Unfortunately, the precipitate has a strong tendency to adhere to equipment surfaces, and due to its finely divided nature, is difficult to filter. This can cause serious problem in maintaining the system in operation. Moreover, the system requires sensitive pH control, and relatively high labor costs can result if plugging problem occur.

U.S. Pat. No. 3,957,448 teaches the addition of ammonia to the exhaust gases of glass-coating equipment; the ammonia reacts with hydrochloric acid and the tin-containing chemical to form powdery solids. These solids are then filtered out of the gas stream in a bag house. Recovery of the tin values from the filtrate, however, introduces complications resulting from the presence of ammonia; the replacement of filter media requires maintenance labor and difficult handling of toxic wastes, and can create yet another waste stream.

Larkin, in U.S. Pat. Nos. 4,144,262 and 4,130,673, and Lindner, in U.S. Pat. No. 4,530,857, discuss the treatment of newly formed and still-hot glass objects with a vapor of monobutyltin trichloride (MBTC) to form a protecting tin-oxide layer on these objects, and the concomitant removal of MBTC from the exhaust gases of that process. Electrostatic precipitators or other devices are recommended.

To solve the problem of waste-stream removal, another method known in the art is that of contacting the exhaust gases with an aqueous solution of a base such as sodium hydroxide. It has been found, however, that known exhaust-gas-treatment methods suffer a number of disadvantages; most methods do not attain the required low levels of metal to permit free emission of the cleaned exhaust gases into the ambient atmosphere. This is the case, for instance, if an electrostatic precipitator or condenser is used.

Scrubbing with caustic solution generates an aqueous metal oxide, the oxide containing a sludge, or mud, which needs to be treated again by filtration or centrifugation, thereby generating a new problem, that of disposal of waste water. This method is also expensive, and generally requires an uneconomical labor input.

SUMMARY OF THE INVENTION

The process of this invention is characterized by:

(a) contacting the vapor containing a tin species with an acidic aqueous medium with a pH value below about 6, and preferably below about 2, in order to absorb a substantial mount of the tin species down to a level in the vapor which allows venting of the vapor into the atmosphere, while keeping the acidic medium essentially free of precipitate, and wherein the acidic medium already contains a minimum level of the tin species to be absorbed, (b) optionally, circulating the acidic aqueous medium to increase the tin concentration in the solution, (c) optionally using the metal-containing solution to recover the accumulated tin as tin, tin oxide or organotin compound, and thereafter, (d) optionally recycling part or all of this solution into the process which generates the tin-containing vapors to replace at least partly the tin compounds used.

BRIEF DESCRIPTION OF THE DRAWING

The drawing figure is a partially schematic representation of apparatus useful in the preferred embodiment of the present invention.

DESCRIPTION OF THE PREFERRED EMBODIMENTS

Figure 1:
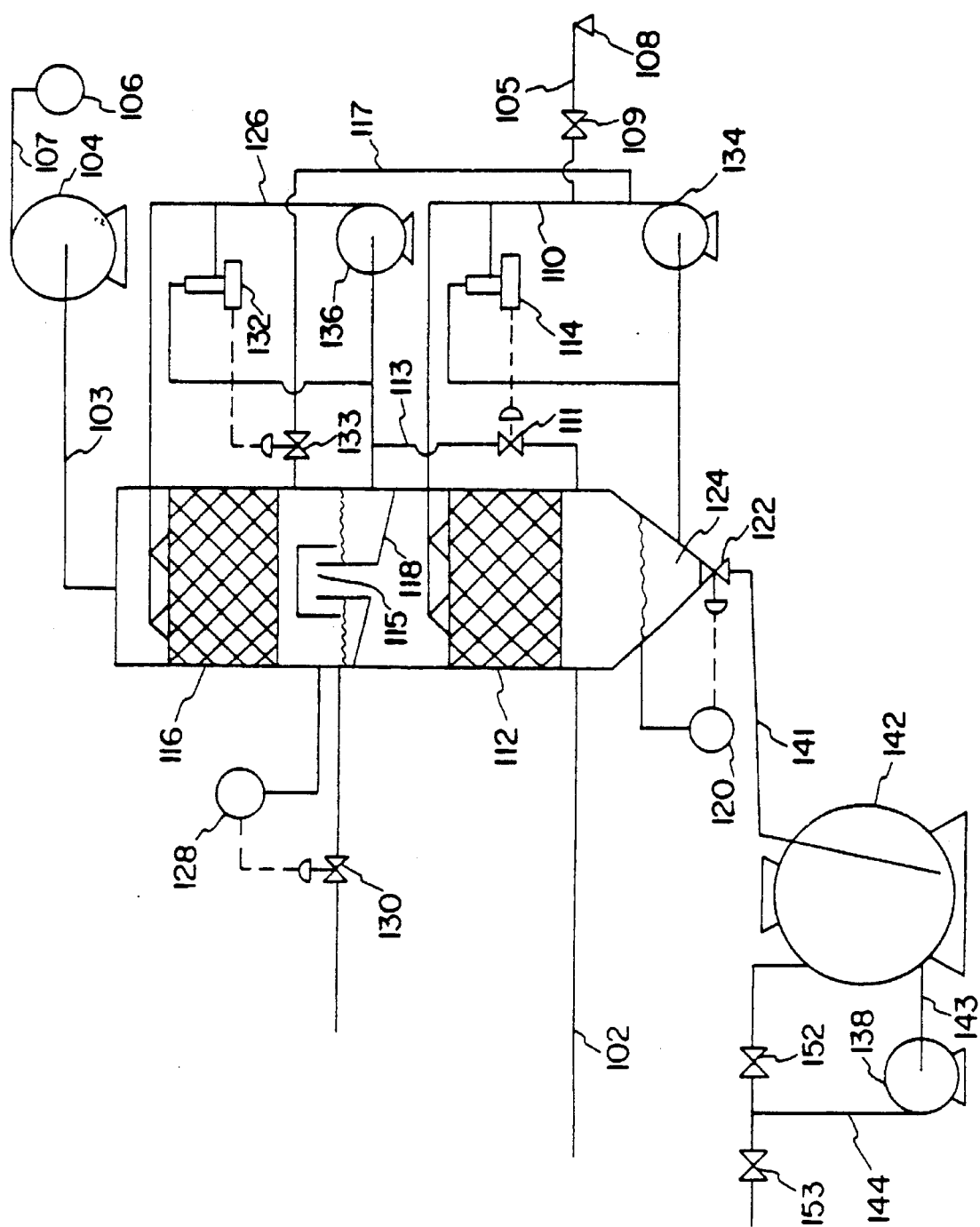

The present invention is a process for removing tin-containing species from vapors emanating from the exhaust gases of installations used in the process of coating glass objects with a layer of tin oxide.

The process of this invention makes possible the relatively simple cleaning of the exhaust gases from the operation of coating glass with tin compounds. It also avoids the generation of solid waste, and prevents the formation of tin-containing waste water in, e.g., a glass plant. The present process makes it possible to clean exhaust gas to a concentration of less than about 5 milligrams (mg) of tin metal per standard cubic meter (SCM) of gas.

It is preferable to recycle the aqueous medium in the manufacturing process of the tin compound. When this recirculation is performed, no timber processing of the aqueous medium is required by the glass manufacturer, and the process does not yield waste products. Such recycling is economically possible because of the high tin concentration which can be achieved, making it feasible to store and transport the scrubbing liquid resulting from the contact of the acid aqueous media with the vapor. It is also possible to recycle all or part of the scrubbing liquid back into the process which generates the tin-containing vapors, to replace part of the virgin metal compound needed. Since in most cases, total recycling in the latter process will lead to an increasingly high acid content in the scrubbing liquid, it is economically advantageous to recycle at least part of the scrubbing liquids into the manufacturing process of the tin compound.

A suitable medium with which to start is one which is primarily water, acidified as necessary to prevent or reduce the precipitation of solids. Due to the circulation, the concentration of the tin species can easily be increased to the desired level.

A preferred concentration of the tin in the contacting solutions is about 5% by weight (wt. %) of tin metal while maintaining a pH value below about 6, preferably below about 2.5, and most preferably below about 2. A tin-metal concentration of preferably about 10 wt. %, and most preferably over 20 wt. %, is used.

The exhaust vapor can be contacted with the liquid medium in a high-energy scrubber. However, according to a preferred embodiment of this invention, the vapor is contacted with a liquid medium in a low-energy scrubber or in a spraying tower under conditions which prevent the formation of a mist.

It is expedient to maintain the vapors at a temperature above the saturation point for the tin species at all times. This can be done by applying additional heat to prevent local formation of conditions of separation of the vapor having tin-containing species. According to one embodiment, steam is added to the exhaust gases to prevent local cooling of the washing liquor in the scrubber. The vapors are preferably maintained at a temperature above their saturation point for the tin species. In another preferred embodiment, the washing liquid is heated by circulating it through a heat exchanger. The present process is especially suited for use with tin tetrachloride, an alkytin halide, or MBTC.

It is known that dilute aqueous solutions of MBTC already have a strong tendency to foam; this interferes with the treatment of vapors in scrubbing systems. Surprisingly, however, it has been found that the present process can be used with high concentrations of tin in the scrubbing liquid without the formation of significant amount of foam.

It will be clear that a concentrated solution can be used in the manufacturing process from which the exhaust vapor was originally discharged, or in the process of manufacturing the tin compound. However, it is also possible to transport the concentrated solution to an off-site facility to recover the metal contained. Because of the very low levels of tin found in the vapors which are finally released, the process of this invention is especially useful in geographical areas which are subject to stringent regulations with respect to emissions of materials deleterious to the atmosphere; if either process economics or consideration for the environment should require the additional treatment, a second device with a more-dilute solution of the tin compound in water can be used in a second step to reduce the metal content of the vapor further.

It has been necessary in the prior art continuously to remove the precipitate formed during processes of contacting exhaust gases with an alkaline solution, the operation being difficult to achieve because the precipitates of tin compounds are notoriously difficult to filter. Filtration and centrifugation themselves are alien operations to the glass-coating industry, and the processes generate effluent water of a quality which does not permit disposal in a sewer or other facility, without further treatment of that effluent itself; contacting the exhaust gases only with water which is constantly renewed gives rise to large quantities of waste water, which also need to be treated further.

Surprisingly, and contrary to expectations based on calculations of the vapor pressures of the tin compounds involved, it has been found that it is possible to use a solution containing significant quantities of tin-containing species, and optionally hydrochloric acid or other acids, as a contacting medium to clean exhaust gases. Using suitable apparatus in accordance with the present invention, it has unexpectedly been found possible to employ contacting solutions which contain over 5, preferably over 10, and most preferably over 20, wt.%, tin-containing species, calculated as tin metal, while maintaining a pH below about 6 in the process medium.

The contact between the liquid and the vapor phase may be effected by a variety of methods, including both static and active agitation, but is preferably done by active mixing of the two phases. For example, the vapor may simply be bubbled through the aqueous medium stored in a reservoir, or by stirring the aqueous medium as the vapor enters the atmosphere above the liquid. In one procedure, the vapor is contacted with the liquid medium in a high-energy scrubber.

In a preferred procedure, the liquid medium is contacted with the vapor in a low-energy scrubbing apparatus or in a spraying tower under conditions which favor the saturation of the vapor with tin-containing species. In accordance with the method of this invention., it is possible to avoid the use of a high-energy scrubber, and to use a simpler and less costly low-energy scrubber, if the vapor is prevented from becoming supersaturated with tin-containing species. It has unexpectedly been found that tin-containing species can be removed from vapors with relative ease and below levels predicted from the calculated partial pressures of the compounds involved at their concentration in the wash liquid, if the vapors are maintained at a temperature above their saturation point for the species involved.

If the vapors are permitted to cool below their saturation point, the resulting finely divided mist or sol of liquid which contains tin compounds is quite difficult to separate from the vapor. In this latter case, more equipment and energy-intensive methods must be employed to separate the mist or sol from the vapor.

This invention includes the process of using an acidic aqueous solution to obtain a relatively high concentration of metal compound in the wash liquor. The degree of acidity of the wash liquor necessary to prevent the formation of precipitate and foaming can be obtained by starting the process with water acidified with a quantity of, e.g., hydrochloric or other suitable or acid.

It is within the spirit and scope of this invention to start the aqueous-treatment step with water already containing a purposely added quantity of a metal or organometal halide such as, e.g., MBTC, which contributes the necessary level of acidity. Further in the process, it will rarely be necessary to add additional acid or tin compound if the exhaust vapors contain an acid such as, e.g., a hydrogen halide. In this case, the process will automatically maintain the required level of acidity.

The process of this invention may be carried out over a range of temperatures; in general, it is advisable to use ambient temperatures for reasons of simplicity and economy. If low-energy scrubbers are employed, means of adding additional heat can be of advantage to prevent local formation of conditions of super-saturation of the vapor with the liquid containing the metallic species such as, e.g., tin halides and organometallic halides, and silanes and the like. In addition, steam can be added to the exhaust gases to prevent local cooling of the wash liquor due to excessive evaporation of water under conditions of low ambient humidity.

If the exhaust gases are very hot, as may be the case in some glass-coating processes, cooling of the circulating liquid or of the exhaust gases may become necessary. Heating or cooling of gases, liquids or the apparatus may be effected by standard engineering methods well known to those skilled in the art, which methods form no part of this invention as such.

The contact time needed between exhaust gases and wash liquid depends upon the level of metal compound to be found in the final exhaust gas which is discharged into the atmosphere following the treatment by the process of this invention. The process is continued as necessary until effluent criteria are met. It can be beneficial towards this end to employ one relatively large scrubbing column or similar device, or to employ a plurality of smaller devices in series. This latter option also allows further increase in the concentration of metal compounds in the solution discharged from the apparatus for recovery of metal and metal-containing compounds; the wash liquid recirculates in the apparatus until the concentration of the metallic moiety in the liquid exceeds the level which enables efficient cleaning of the exhaust gases. This level can vary as a function of the temperature or design parameters of the apparatus, but is readily determined for a given set of circumstances.

For the cleaning of exhaust gases from the process of coating of glass with tin oxide using MBTC as a precursor, maximum concentrations over 10 wt.% in the wash liquid, calculated as tin metal, can be obtained. In the case of more than one wash device in series, and using the wash liquor of one device to feed the previous one, the concentration of tin metal in the first device may reach 20% or more. The performance of the apparatus can be easily monitored by measuring a physical parameter such as e.g., density, to control the concentration of the wash liquid. In the event that more than one device is used in series, a predetermined level can be maintained by replacing part of the liquid by water or wash liquid from the downstream wash device.

In a preferred embodiment of the invention, the apparatus to remove metallic species from process-stream vapors is connected to receive the exhaust vapors from a facility for coating glass objects with tin oxide. A variety of tin compounds are known to be useful for such a purpose; such compounds include, but are not limited to, e.g., MBTC, tin tetrachloride, dimethyltin dichloride, dibutyltin diacetate, monomethyltin trichloride and the like. Particularly preferred compounds are tin tetrachloride and alkyltin trichlorides. Descriptions of such tin-coating processes can be found in, e.g., U.S. Pat. Nos. 4,530,857, 4,144,362 and 4,130,673. The process of this invention is useful for removing tin compounds and their metal-containing reaction or breakdown products from exhaust gases of such processes. The inventive process will at the same time remove from the exhaust gases substantially all hydrochloric or other acids which may have formed during the coating operation.

Therefore, the present invention embraces the process of removing the excess tin species and reaction products from the resultant exhaust gases of tin-compound deposition, which process comprises the steps of:

(a) Contacting the glass substrate which is at a temperature between about 350 and about 650° C. with a vapor or a finely divided spray of at least one tin compound capable of forming a layer of tin oxide on the surface of the glass substrate under those conditions;

(b) Contacting the exhaust gases from this process, which gases may contain reaction products or unreacted portions of the tin compounds, with an aqueous acidic wash liquid to reduce the tin content of the exhaust gases;

(c) Recirculating the wash liquid until it contains more than about 5 and preferably more than about 10 wt. % of tin metal in the form of the original tin compounds or their reaction or breakdown products; and (d) Using the wash liquid for recovery of the tin compounds or of tin metal.

The following examples describe and illustrate the effect of the concentration of metal in the scrubbing liquid, and the temperature and relative humidity of the vapor to be scrubbed on the residual concentration of metal species in the vapor at the exit of the scrubber.

EXAMPLE I

In this example, 7 cubic meters ($m^3$) of dry air at 20° C. and one atmosphere was humidified to a predetermined relative humidity at 20° C. Then, 0.7 $m^3$ of this air was heated and laden with 2.66 grams (g.) of MBTC, passed through a glass tube heated at 550° C., and thereafter recombined with the remaining 6.3 $m^3$ of the air. Using this procedure, approximately 30% of the MBTC used remains behind in the glass tube in the form of tin oxide, and the resulting vapor simulates closely the exhaust gases of the process of coating glass containers with a layer of tin oxide by means of treatment with MBTC vapor.

The vapor was maintained at a preset temperature and passed through a first glass column of 80 millimeters (ram) diameter and 300 mm height, filled with glass rings; a 3% aqueous solution of hydrochloric acid was circulated through the column. After leaving the first column, the vapor passed through a second glass column of 80 mm diameter and 300 mm length, also filled with glass rings. Tap water was circulated through the second column, and solution from this column was used to replenish the liquid in the first column in order to maintain the desired concentration of MBTC in that first column. The tin concentration of the vapor at the exit of the second column was measured. The results in mg of tin metal in SCM of vapor are given in the following tables.

TABLE I

TIN CONCENTRATION AFTER GAS-WASHING
Milligrams of Tin per Cubic Meter

| Inlet Temperature 40° C. Scrubbing Liquid | | % Relative Humidity @ 20° C. | | | |
|---|---|---|---|---|---|
| Sn % | Density | 7 | 50 | 100 | 125 |
| 3 | 1.05 | 5 | 7 | 5 | 10 |
| 6 | 1.10 | 20 | 9 | 2 | — |
| 8 | 1.15 | 1.5 | — | 2 | — |
| 11 | 1.20 | 1.5 | — | 2 | 2 |
| 14 | 1.25 | 1.5 | — | 2 | 2 |
| 17 | 1.30 | 1.5 | — | 2 | 2.5 |
| 20 | 1.35 | 2 | — | — | 6 |

TABLE II

| Inlet Temperature 50° C. Scrubbing Liquid | | % Relative Humidity @ 20° C. | | | |
|---|---|---|---|---|---|
| Sn % | Density | 7 | 50 | 100 | 125 |
| 3 | 1.05 | 6 | 6 | 3.5 | 3.5 |
| 6 | 1.10 | 5 | 4 | 1.5 | 1.5 |
| 8 | 1.15 | 3.5 | 2.5 | — | 1.5 |
| 11 | 1.20 | 1.5 | 1.5 | — | 1.5 |
| 14 | 1.25 | 1.5 | — | 2 | 2 |
| 17 | 1.30 | 1.5 | — | 2 | 2.5 |
| 20 | 1.35 | 2 | — | — | 6 |

TABLE III

| Inlet Temperature 60° C. Scrubbing Liquid | | % Relative Humidity @ 20° C. | | | |
|---|---|---|---|---|---|
| Sn % | Density | 7 | 50 | 100 | 125 |
| 3 | 1.05 | 3.5 | — | — | 3 |
| 6 | 1.10 | 10 | 4 | — | 2 |
| 8 | 1.15 | 1.5 | 1.5 | — | 1.5 |
| 11 | 1.20 | 1.5 | — | 2 | 2.5 |
| 14 | 1.25 | 1.5 | — | 1.5 | 1.5 |
| 17 | 1.30 | 2 | — | 1.5 | — |
| 20 | 1.35 | 2 | 2 | — | 4 |

EXAMPLE II

The following example demonstrates the effect of the concentration of MBTC and one of its breakdown products, hydrochloric acid, on the formation of foam on the scrubbing liquid.

Seventy liters per hour of nitrogen, measured at 20° C. and one atmosphere, were passed through 20 ml of liquid in a test tube 200 mm long and 24 mm wide, by means of a polytetrafluoroethylene tube of 3 mm internal diameter. The liquid was of the composition given in the tables below. After the foam generated had reached a stable height, it was measured; foam height is reported in mm in the tables.

The results demonstrate that at relatively high concentrations of MBTC, the amount of foaming was reduced to acceptable levels. Further, a surprisingly beneficial effect of an increased concentration of the breakdown product, hydrochloric acid, appears. The extent of foam formation was also dependent on the nature of the scrubbing water. As can be seen from the results, fairly small amounts of MBTC suffice to generate considerable foam, rendering it impossible to use otherwise unprocessed water in a scrubbing device.

TABLE IV

Formation of Foam in Millimeters at Various
Concentrations of Hydrochloric Acid and MBTC in Tap Water
(9° German Hardness)

| MBTC Concentration | | HCl Concentration Mol/l. | | | | | | | | |
|---|---|---|---|---|---|---|---|---|---|---|
| | | 0 | 0.025 | 0.05 | 0.1 | 0.15 | 0.2 | 0.25 | 0.337 | 0.5 |
| | | | | | | g/l. | | | | |
| Mol/l. | g/l. | 0 | 0.9 | 1.8 | 3.7 | 5.5 | 7.3 | 9.1 | 12.3 | 18.3 |
| 0 | 0 | 10 | — | — | — | — | — | — | — | — |
| 0.018 | 5.1 | — | — | — | — | — | — | — | — | — |
| 0.035 | 9.9 | >140 | — | — | — | — | — | — | — | — |
| 0.053 | 15.0 | — | — | — | — | — | — | — | — | — |
| 0.071 | 20.0 | >140 | — | 75 | — | — | 40 | — | — | 30 |

TABLE IV-continued

Formation of Foam in Millimeters at Various
Concentrations of Hydrochloric Acid and MBTC in Tap Water
(9° German Hardness)

| MBTC Concentration | | HCl Concentration Mol/l. | | | | | | | | |
|---|---|---|---|---|---|---|---|---|---|---|
| | | 0 | 0.025 | 0.05 | 0.1 | 0.15 | 0.2 | 0.25 | 0.337 | 0.5 |
| | | | | | | g/l. | | | | |
| Mol/l. | g/l. | 0 | 0.9 | 1.8 | 3.7 | 5.5 | 7.3 | 9.1 | 12.3 | 18.3 |
| 0.089 | 25.1 | — | — | — | — | — | — | — | — | — |
| 0.133 | 37.5 | >140 | 100 | 75 | — | 70 | — | 30 | — | 20 |
| 0.177 | 49.9 | >140 | — | 100 | — | 40 | — | — | — | 20 |
| 0.226 | 63.8 | 30 | — | — | — | — | — | — | — | 20 |
| 0.354 | 99.9 | 15 | — | — | — | — | — | — | — | 20 |

TABLE V

Formation of Foam in Millimeters at Various Concentrations
of Hydrochloric Acid and MBTC in Demineralized Water

| MBTC Concentration | | HCl Concentration Mol/l. | | | | | | | | |
|---|---|---|---|---|---|---|---|---|---|---|
| | | 0 | 0.025 | 0.05 | 0.1 | 0.15 | 0.2 | 0.25 | 0.337 | 0.5 |
| | | | | | | g/l. | | | | |
| Mol/l. | g/l. | 0 | 0.9 | 1.8 | 3.7 | 5.5 | 7.3 | 9.1 | 12.3 | 18.3 |
| 0 | 0 | 10 | — | — | — | — | — | — | — | — |
| 0.018 | 5.1 | 40 | 40 | 40 | 40 | 30 | 30 | 25 | 25 | 25 |
| 0.035 | 9.9 | >140 | 140 | 80 | 70 | 40 | 30 | 25 | 30 | 25 |
| 0.053 | 15.0 | >140 | 100 | 80 | 40 | 35 | — | — | — | 25 |
| 0.071 | 20.0 | 70 | 50 | 50 | 35 | — | — | — | — | 20 |
| 0.089 | 25.1 | 35 | — | 30 | — | — | — | — | — | 20 |
| 0.133 | 37.5 | 20 | — | — | — | — | — | — | — | 20 |

Contrary to expectation, it was found that at least 20 wt. % of tin in the scrubbing liquid can be tolerated, and in fact has a surprisingly beneficial effect on the efficiency of the scrubbing process. The results also indicate that absorption of the tin compound increases with higher relative humidity and higher inlet temperature of the gas.

While not intending to be bound by the theory advanced here, a possible explanation may be that the conditions of the examples given herein, contrary to expectations, help to prevent the formation of finely divided mists of the products to be removed. It has been found to be very difficult to remove such mists from vapors by scrubbing or other means known in the art.

The finding that scrubbing with a liquid which already contains a substantial amount of the products to be removed from a vapor helps to resolve a number of serious problems associated with the cleaning of these gases, and is an unexpected and important improvement which makes it unnecessary to employ difficult processes such as washing the gas with a caustic solution and centrifuging or filtering off the resulting precipitates while passing the filtrate through a secondary waste-water cleaning system. Additionally, it is unnecessary to use high-energy scrubbers or electrostatic precipitators, and the volume of the solution generated is considerably reduced, leading to further economies in the treatment of potentially deleterious effluent a process streams.

The drawing figure illustrates apparatus whereby the process of the present invention is conducted. The exhaust duct 102 can be connected to a facility to coat glass or other materials with a layer of tin oxide, or to other installations which general exhaust gases containing metal species.

The exhaust vapor to be cleansed of tin or other metallic species is urged by atmospheric or process pressure from the manufacturing or application unit, not shown, through inlet process line 102 and outlet process line 103 as the result of decreased pressure in line 102 caused by the operation of blower 104. The gas flow is measured by flow indicator 106 in exit line 107 of blower 104.

Steam from an external source 108 is fed through line 105 and valve 109 into the circulation pipe 110 of the first scrubber bed 112 to maintain the temperature of the circulating liquid 124 above the dew point of the exhaust gases at all times. In this example, a double scrubber bed 112 and 116 is used, although those skilled in the art will realize that a single or multiple installation may also be employed within the scope and spirit of this invention. The illustrated arrangement enables maintenance of a tin concentration in the first scrubber bed 112 of about 15 wt. %, calculated as tin metal. The concentration of the liquid 124 is kept substantially constant by means of first specific-mass controller 114 which feeds more dilute liquid 118 from the second scrubber bed 116 through line 113 and valve 111 into the first bed 112. If the level of the liquid 124 in the first scrubber 112 becomes too high, level controller 120 opens bottom valve 122 to drop some liquid 124 through line 141 into storage tank 142. From first bed 112, the gases pass through baffle 115 into second bed 116 which has a separate liquid circuit 126 for recirculation of the liquid 118 therewithin to provide adequate contact of the exhaust stream and the treating liquid 118.

On decrease of the level of liquid 118, level controller 128 opens water-inlet valve 130 to maintain the appropriate operational liquid level. Optionally, if the tin concentration in second scrubber 116 becomes lower than about 1 wt. %, second specific-mass controller 132 can feed liquid 124 from first scrubber 112 through line 117 and valve 133 into second scrubber 116 in order to maintain the required acidity and to prevent the formation of precipitates and foaming. However, it has surprisingly been discovered that when the exhaust species is MBTC, this added step is unnecessary. In one embodiment of the invention, therefore, line 117 and second specific-mass controller 131 are not used. On startup, some hydrochloric acid is added into both liquid reservoirs; acidity is thereafter maintained by the hydrogen chloride present in the exhaust gases.

Pumps 134 and 136 circulate wash liquid 124 and 118 over the scrubber beds 112 and 116, which are filled with a suitable packing material such as, e.g., glass helices, porcelain or polymeric saddles or the like. Pump 138 serves to unload storage tank 142 through lines 143 and 144, controlled by valves 152 and 153, into a tank truck or other means of transport, or recycle and recovery apparatus, not shown and forming no part of this invention as such.

In a determination of the utility of the present invention, exhaust air was drawn into the unit described hereinabove from glass-coating machinery installed on the downstream end of ten bottle-blowing machines. The exhaust air amounted to 90 m$^3$ of exhaust gas per minute, containing an average of about 130 mg of tin calculated as tin metal and about 140 mg per SCM of hydrochloric acid calculated as HCl. The inlet temperature of the exhaust gas was between 50 and 75° C., depending on the conditions in the glass-manufacturing plant Analysis of the effluent in exit line 107 showed that the tin concentration, calculated as tin metal, was at all times below 5 mg per SCM of exhaust gas. The apparatus produced 105 kilograms (kg) of a solution containing about 16 kg per day of tin, calculated as tin metal.

Modifications and improvements to the preferred forms of the invention disclosed and described herein may occur to those skilled in the an who come to understand the principles and precepts hereof. Accordingly, the scope of the patent to be issued hereon should not be limited solely to the embodiments of the invention set forth herein, but rather should be limited only by the advance by which the invention has promoted the art.

What is claimed is:

1. A process for treating exhaust gases containing at least one tin compound selected from the group consisting of tin tetrachloride, alkyl tin halides and mixtures thereof to remove the said at least one tin compound comprising contacting the exhaust gases with an aqueous acidic liquid absorbing medium that is not in the form of a mist, having a pH of about 6 or less so that any tendencies to form precipitates or foams are suppressed to absorb said at least one tin compound from the exhaust gases until the absorbing medium contains at least 5 weight percent tin compound, calculated as tin metal.

2. A process as defined in claim 1 in which pH of the absorbing medium is less than about 3.

3. A process as defined in claim 1 in which the pH of the absorbing medium is less than about 2.

4. A process as defined in claim 1 wherein the absorbing medium already contains at least one tin compound before contact of the vapor stream therewith.

5. A process as defined in claim 4 wherein the at least one tin compound present in the absorbing medium is present because of recirculation of the absorbing medium in the process.

6. A process as defined in claim 4 wherein the at least one tin compound present in the absorbing medium has been incorporated therein prior to use of the absorbing medium.

7. A process as defined in claim 1 in which the contacting proceeds until the absorbing medium contains at least about 10 weight percent tin compound, calculated as tin metal.

8. A process as defined in claim 1 in which the contacting proceeds until the absorbing medium contains at least about 20 weight percent tin compound, calculated as tin metal.

9. A process as defined in claim 1 wherein the exhaust gases are contacted with the absorbing medium substantially without saturating the absorbing medium with the at least one tin compound.

10. A process as defined in claim 1 further comprising recovering the at least one tin compound from the absorbing medium.

11. A process as defined in claim 1 wherein the content of tin in the exhaust gases is reduced to about 5 mg per standard cubic meter or less.

12. A process as defined in claim 1 wherein the at least one tin compound comprises monobutyl tin trichloride.

13. A process as defined in claim 1 wherein the at least one tin compound consists of monobutyltin trichloride and is recovered as monobutyltin trichloride from the absorbing medium.

14. A process as defined in claim 31 wherein the used, tin-containing absorbing medium is removed from the process and stored.

15. A process as defined in claim 31 wherein used absorbing medium is removed and replaced with water or with more dilute absorbing medium.

16. A process as defined in claim 1 wherein the exhaust gases are contacted with the absorbing medium in two or more stages.

* * * * *